United States Patent
Rousu et al.

(10) Patent No.: US 8,750,944 B2
(45) Date of Patent: Jun. 10, 2014

(54) WIRELESS COMMUNICATION APPARATUS AND METHOD

(75) Inventors: Seppo Rousu, Oulu (FI); Yrjo Kaipainen, Espoo (FI); Kim Kaltiokallio, Helsinki (FI); Jonne Soininen, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 216 days.

(21) Appl. No.: 13/359,092

(22) Filed: Jan. 26, 2012

(65) Prior Publication Data

US 2013/0136196 A1 May 30, 2013

(30) Foreign Application Priority Data

Nov. 24, 2011 (GB) .................................. 1120328.8
Jan. 24, 2012 (GB) .................................. 1201153.2

(51) Int. Cl.
*H04M 1/00* (2006.01)
*H04M 1/60* (2006.01)

(52) U.S. Cl.
CPC .......... *H04M 1/6075* (2013.01); *H04M 1/6091* (2013.01)
USPC ....................................... 455/569.2; 455/572

(58) Field of Classification Search
USPC .................... 455/569.2, 435.1, 574
See application file for complete search history.

(56) References Cited

U.S. PATENT DOCUMENTS

| | | | | |
|---|---|---|---|---|
| 5,659,888 A | * | 8/1997 | Kato et al. | 455/575.7 |
| 6,334,081 B1 | * | 12/2001 | Robinson et al. | 701/48 |
| 6,344,828 B1 | * | 2/2002 | Grantz et al. | 343/713 |
| 6,647,323 B1 | * | 11/2003 | Robinson et al. | 701/1 |
| 2003/0169852 A1 | * | 9/2003 | Otero | 379/37 |
| 2004/0119644 A1 | * | 6/2004 | Puente-Baliarda et al. | 343/700 MS |
| 2005/0177252 A1 | * | 8/2005 | Chernoff et al. | 700/17 |
| 2006/0067262 A1 | | 3/2006 | Troemel, Jr. | |
| 2007/0010294 A1 | | 1/2007 | Shinoda et al. | 455/569.2 |
| 2008/0089081 A1 | | 4/2008 | DeLine et al. | 362/494 |
| 2010/0248644 A1 | | 9/2010 | Kishi et al. | |
| 2012/0196544 A1 | * | 8/2012 | Bolingbroke | 455/68 |
| 2013/0052985 A1 | * | 2/2013 | Tujkovic et al. | 455/404.2 |
| 2013/0130626 A1 | * | 5/2013 | Witkowski et al. | 455/41.2 |
| 2013/0159190 A1 | * | 6/2013 | Paintin | 705/44 |
| 2013/0195264 A1 | * | 8/2013 | Kirchhoff et al. | 379/212.01 |
| 2013/0269003 A1 | * | 10/2013 | Wentker et al. | 726/4 |

FOREIGN PATENT DOCUMENTS

| | | |
|---|---|---|
| WO | 2011006451 A1 | 1/2011 |
| WO | 2012093742 A1 | 7/2012 |
| WO | 2012096394 A1 | 7/2012 |
| WO | 2012096449 A2 | 7/2012 |

* cited by examiner

*Primary Examiner* — Creighton Smith

(74) *Attorney, Agent, or Firm* — Stanton IP Law

(57) ABSTRACT

In relation to wireless communication, a communications apparatus suitable for installation into a vehicle provides a user-driven communication capability in a vehicle communications system. The apparatus includes means providing a wide-area communication capability, at least one antenna interface for conveying signals to and/or from at least one antenna providing wide-area communication, at least one power input configured to receive operating power for the apparatus from a vehicle and at least one digital communication interface for providing connectivity to a master unit of the vehicle.

31 Claims, 9 Drawing Sheets

WIRELESS COMMUNICATION APPARATUS AND METHOD

TECHNICAL FIELD

The invention relates to wireless communications. More particularly, the invention relates to a solution for providing wireless communication capabilities in a vehicle and to an apparatus providing the wireless communication capabilities.

BACKGROUND OF THE INVENTION

Various communication capabilities are becoming more and more popular also in a car, automotive, motor cycle, environment both in work and free time usage. The most common existing communication capability is the ability to receive radio transmission in a car. The car is provided with an antenna, which has been placed in such a location that it is able to receive radio transmissions. The antenna is cabled to a car radio which processes signals received via the antenna. Relating to cellular communications, although it is possible to use a normal mobile phone in a car, most car manufacturers nowadays offer also an integrated mobile communication solution in their cars. In the integrated solutions, the car comprises the necessary components that are needed for cellular communications. In this solution, all the user needs to do is to insert his user identity module into the integrated system. The integrated system typically uses a dedicated antenna which is located, for example, on the roof of the car. The antenna is cabled to a centralized unit near a dashboard of the car, and the centralized unit comprises the remaining components needed for cellular communications.

In order to receive a radio frequency (RF) signal properly in most conditions, an antenna receiving the RF signal need to be located outside the car chassis. If the antenna is inside the car chassis, the received RF signals are significantly attenuated or otherwise interfered. The car chassis attenuation to the RF signals may be significant and this attenuation depends at least on signal and fading signal directions, antenna locations, antenna directivity, objects and material properties in signal path, operational signals frequency, etc. Furthermore, the longer the antenna cable is, the higher is the attenuation resulting from the cable. Additionally, attenuation may be related to antenna cable quality and quality of connectors, quality of joint between connectors, quality of joint between connectors and cable. The reception quality is also impacted by signal to noise and signal to interference ratios. Furthermore, reasonably good quality RF cables and connectors are usually also expensive.

Furthermore, in an automotive environment already rather short cables and connectors may be affected by noise sources and interferences sources so that reception quality may degrade by a detectable amount. For example, a user may detect a reduced net coverage or reduced data throughput.

Inspecting RF frequency related interferences and interfered system may be a difficult problem to solve in a distributed architecture, especially when a root cause may be an unsuccessful assembly during manufacturing. The same which applies between an antenna and RF components following the antenna applies also to RF signals' quality and attenuation between active/passive RF components/RF transceiver. Active RF components may also need additional controls and a power source with cabling for a designed operation. Furthermore, signals between an RF transceiver and a cellular transceiver baseband module may be impacted by interferences and signal attenuation thus degrading communication system performance. Similarly, if RF signals are to be sent with an antenna located inside the car chassis, coverage of the RF signals decreases significantly due to attenuation.

Cabling in a car is easiest to make when manufacturing the car. The cabling and other special purpose sensitive technology and electricity, however, needs to be transparent for the owner of the car. Thus, when manufacturing a car and installing, for example, a radio antenna and an antenna for cellular communications, a significant amount of cabling needs to be done and a number of different modules and other components are needed. Installation also takes time. Later on, when an installed module or other component is malfunctioning and/or is being interfered, maintenance costs due to various electrical parts, skilled workmanship, needed testers etc. may be significant for finding and replacing the malfunctioning module, component, cable or connector.

Furthermore, in the automotive industry, various parts of a vehicle need to be made available for a long time as spare parts. Sometimes two separate parts need to also be type approved together, especially radio related parts. This may lead to a situation that a new part may not be functional with an older part, for example due to an emission spectrum or interoperability, and thus it would be necessary to replace both parts if one them is to be replaced. Technology and new requirements, relating to, for example, taxation or road taxes, may require modularity and upgradability from systems in a car during its lifetime, which may be quite long in automotive cases. This also generates various requirements for parts of a vehicle.

It would be beneficial to solve or at least alleviate the above drawbacks.

SUMMARY

In a first exemplary embodiment of the invention, there is provided an apparatus comprising: a wide-area communication capability; at least one antenna interface for conveying signals to and/or from at least one antenna providing wide-area communication; at least one power input configured to receive operating power for the apparatus from a vehicle; and at least one digital communication interface for providing connectivity to a master unit of the vehicle, the apparatus arranged for installation into a vehicle and providing a user-driven communication capability in a vehicle communications system.

In one embodiment, the apparatus supports at least a first, normal mode of operation and a second, emergency mode of operation, and comprises means to switch between said modes of operation.

In one embodiment, in the normal operation mode, a user interface for the apparatus is provided by equipment external of the apparatus.

In one embodiment, the apparatus further comprises user interface elements for providing audio user interface functionalities only in an emergency operation mode.

In one embodiment, a user interface, by which a user can communicate using the apparatus, is provided by the vehicle communications system and, wherein, the apparatus, at least during a normal mode of operation thereof, is arranged to operate in response to signals from the user interface and facilitate user communications via the user interface.

In one embodiment, the apparatus further comprises at least one additional wide-area communication capability. In one embodiment, the at least one additional wide-area communication capability comprises at least one of positioning capability by time delay/difference measurements, frequency modulation (FM) capability, amplitude modulation (AM)

capability, digital audio radio capability, digital radio broadcasting capability, digital television broadcasting capability and vehicle to vehicle communication capability.

In one embodiment, the at least one antenna interface is arranged to convey signals to and/or from at least one antenna for providing the at least one of positioning capability by time delay/difference measurements, frequency modulation capability, amplitude modulation capability, digital audio radio capability, digital radio broadcasting capability, digital television broadcasting capability and vehicle to vehicle communication capability.

In one embodiment, the apparatus further comprises at least one short-range communication capability.

In one embodiment, the at least one antenna interface is arranged to convey signals to and/or from at least one antenna for providing short-range communication.

In one embodiment, one or more antenna of the at least one antenna is an integrated antenna of the apparatus.

In one embodiment, one or more antenna of the at least one antenna is an external antenna to the apparatus.

In one embodiment, the wide-area communication capability comprises a cellular wireless communication capability.

In one embodiment, the at least one short-range communication capability comprises at least one of a frequency modulation (FM) radio capability, amplitude modulation (AM) capability, a wireless short-range communication capability, a near field communication (NFC) capability, and a radio frequency identification (RFID) capability.

In one embodiment, the at least one digital communication interface provides the connection to the master unit of the vehicle via a wireless communication link. In one embodiment, the wireless communication link may also provide connection to outside, vehicle cabin located devices, vehicles, audio devices, displays, gaming devices, entertainment devices, communication devices, service purposes and/or computing devices etc.

In one embodiment, the at least one digital communication interface provides the connection to the master unit of the vehicle via a wired communication link. In one embodiment, the digital communication interface may also provide a connection to outside, vehicle cabin located devices, vehicles, audio devices, displays, gaming devices, entertainment devices, communication devices, service purposes and/or computing devices etc.

In one embodiment, the apparatus comprises a user identity module interface for receiving a user identity module.

In one embodiment, the apparatus is configured to receive and/or transmit information relating to a user identity module via the at least one digital communication interface.

In one embodiment, the apparatus is configured to receive and/or transmit information relating to a user identity module via wireless short-range communication.

In one embodiment, the at least one power input receives the operating power for the apparatus via the at least one digital communication interface.

In one embodiment, the apparatus comprises a single packaged vehicle part or module.

In one embodiment, the vehicle part comprise one of a window, a rear-view mirror, a side mirror housing, a front pillar, a middle pillar, a rear pillar, a light housing and a brand logo (e.g. the part, or at least a visible portion of it, may be made in a form which physically matches a manufacturer's trading logo or symbol, to be installed in a location, for example on a car bonnet or boot lid, where the logo would typically be found). Such brand logos may be located in other known places.

In a second exemplary embodiment of the invention, there is provided a vehicle part comprising an apparatus of the first aspect.

In one embodiment, the vehicle part comprises at least one integrated antenna for providing communication capability for the apparatus.

In one embodiment, the antenna cabling length is minimized between the at least one integrated antenna of the vehicle part and the apparatus. This means that the power loss of conveyed signals between the at least one integrated antenna of the vehicle part and the apparatus is minimized.

In one embodiment, the vehicle part is a vehicle part where at least one of attenuation, noise, interference of radio frequency signals and antenna radiation efficiency is in a tolerable level when installed in a vehicle.

In a third exemplary embodiment of the invention there is provided a vehicle comprising an apparatus of the first aspect. The vehicle comprises a master unit configured to communicate with the apparatus and power providing means for providing operating power for the apparatus.

In one embodiment, the vehicle comprises at least one antenna integrated to a window of the vehicle and coupled to the apparatus via the at least one antenna interface, wherein the apparatus is arranged in proximity in relation to the at least one antenna integrated to the window.

In one embodiment, the apparatus comprises at least one internal antenna and the apparatus is integrated in a vehicle part where at least one of attenuation, noise, interference of radio frequency signals and antenna radiation efficiency is in a tolerable level.

In one embodiment, the vehicle comprises at least one antenna integrated in a vehicle part where at least one of attenuation, noise, interference of radio frequency signals and antenna radiation efficiency is in a tolerable level.

In one embodiment, the antenna cabling length is minimized between the at least one integrated antenna of the vehicle part and the apparatus. This means that the power loss of conveyed signals between the at least one integrated antenna of the vehicle part and the apparatus is minimized.

In one embodiment, the vehicle part comprise one of a window, a rear-view mirror, a side mirror housing, a front pillar, a middle pillar, a rear pillar, a light housing and a brand logo.

In one embodiment, the vehicle may contain multiple apparatuses which may be chained together and one of them having connection interface to the master unit. Alternatively, each apparatus may have a connection to master unit.

In one embodiment, the apparatus measures environmental temperatures inside and outside of the vehicle, and share information to the master unit.

The embodiments of the invention described hereinbefore may be used in any combination with each other. Several of the embodiments may be combined together to form a further embodiment of the invention.

The benefits of at least some embodiments of the invention are related to reduced signal attenuation in a vehicle environment.

BRIEF DESCRIPTION OF THE DRAWINGS

The accompanying drawings, which are included to provide a further understanding of the invention, illustrate non-limiting exemplary embodiments of the invention and, together with the description, help to explain the principles of the invention. In the drawings.

DETAILED DESCRIPTION OF THE DRAWINGS

Figure 1:
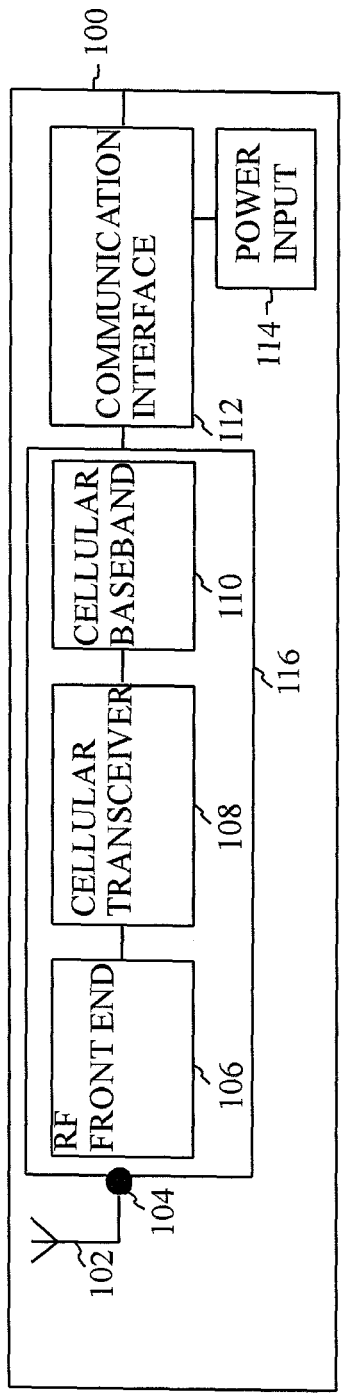
FIG. 1 is a schematic block diagram that illustrates an apparatus according to one embodiment of the invention.

Reference will now be made in detail to exemplary embodiments of the present invention, examples of which are illustrated in the accompanying drawings.

Embodiments of the invention find application in vehicle communications systems. A typical vehicle communications system may comprise, for example, a user interface of some kind for driving/controlling the operation of the apparatus, at least one antenna, a power source, a controller and a transceiver. Embodiments of the invention can conveniently afford vehicle manufacturers an opportunity to design a vehicle, including a vehicle communications system, and manufacture the vehicle including installing all or at least a majority of the aforementioned components during manufacture, while installation and testing are relatively easy to perform, and while preserving options to easily add or upgrade communications capabilities.

The communications capability of the vehicle communications systems is determined by a communication apparatus (various embodiments of which will be described in detail below). Such a communications apparatus may be provided in various guises, providing various capabilities and upgrade options, and may be swapped for newer variants with relative ease, for example to provide support for the latest communications standards, during the operating life of the vehicle. Such a communications apparatus may be installed during vehicle manufacture (along with the other components of the system), or could instead be installed, and/or replaced, with relative ease at any time after manufacture, with limited or even no need to interfere with or replace other components such as user interface and/or antenna components of the system. Indeed, at least some user interface components may double up for operation with infotainment and/or other interactive systems.

According to certain embodiments of the invention, a communication apparatus benefits (e.g. in terms of cost and complexity) by not having any physical user interface components (e.g. microphone, speaker, input device) of its own, although control logic may be provided to control externally-provided user interface components. According to other embodiments, certain user interface components (e.g. microphone, speaker) may be provided, which can be used, as will be described, during an emergency mode of operation. Such embodiments may only be provided with a rudimentary user interface—for example, a graphical display and/or keypad may be omitted—and the installed location of the apparatus in the vehicle may mean that the user interface components that are provided (e.g. microphone, speaker) are not suitable, and/or are not of suitable quality, for general communication and/or infotainment use.

As applied herein, scenarios in which an emergency mode of operation is active (or may be activated)—i.e. in an emergency—typically encompasses scenarios such as a respective vehicle being in a collision, for example, with another vehicle or stationary or moving object; such emergency scenarios may also encompass a theft of the vehicle (e.g. detected by a vehicle theft detection security system), or a robbery or attack directed at the vehicle or driver/passenger of a vehicle; additionally, emergency scenarios may encompass potentially more minor incidents, such as a vehicle running out of fuel, an engine (or other operating part) of a vehicle not being functional, a flat battery, or the like.

In order to facilitate easy addition or replacement of a communications apparatus, certain embodiments provide an apparatus with a standard set of interfaces and/or connections, such as a communication/control interface, one or more antenna interfaces and a power interface, which are arranged to couple to corresponding vehicular interfaces. In some embodiments, the apparatus comprises a single packaged module or vehicle part, having a casing that comprises a standard size and physical configuration (i.e. shape and placement of the interfaces); whereby alternative/future modules can be provided with the same physical configuration to facilitate easy replacement or upgrade.

Embodiments of the communication apparatus will now be described.

FIG. 1 illustrates an apparatus 100 according to one embodiment of the invention. The apparatus 100 comprises an antenna 102 for cellular communications. The antenna 102 is connected via an antenna interface 104 to a wide-area communication module 116. The wide-area communication module 116 comprises a radio frequency (RF) front end 106. The RF front end module 106 is connected to a cellular transceiver 108, and the cellular transceiver 108 is connected to a cellular module 110. A communication interface 112 receives information from the cellular baseband module 110 in a digital form. A power input 114 receives operation power from a vehicle and provides operating power for the various elements of the apparatus 100 (not shown for clarity).

In one embodiment, the power input 114 receives the operating power for the apparatus 100 via the digital communication interface 112. In one embodiment, the power input 114 may have a connection to an extra battery for emergency communication, to be used if other powering cables are broken, for example, due to a traffic accident. The extra battery may be integrated into the apparatus, or have housing in the apparatus or in its proximity. Additionally, the power input 114 may have connections to a solar cell or to other energy sources.

In one embodiment of FIG. 1, the operating power is received via the communication interface 112. If a communication link between the communication interface 112 of the apparatus 100 and a master unit of a vehicle is, for example, implemented as a universal serial bus (USB) or power over Ethernet (PoE) interface, there is no need to arrange separate powering for the apparatus 100. In another embodiment of FIG. 1, the operating power for the apparatus 100 is received by the power input 114 via a separate connection other than the communication interface 112. The communication link may be implemented using other suitable techniques with or without a powering capability.

In another embodiment of FIG. 1, the power input 114 receives the operating power for the apparatus 100 from an emergency case battery directly or via the communication interface 112. In another embodiment of FIG. 1, the operating power for the apparatus 100 is received from a solar cell.

FIG. 1 shows that the antenna 102 is an internal element of the apparatus 100. In another embodiment, the RF front end 106 may have an interface for at least one external antenna, antenna module or antenna system. Yet in another embodiment the antenna 102 may be partly arranged in the apparatus 100 and partly extending outside the apparatus 100.

Figure 2:
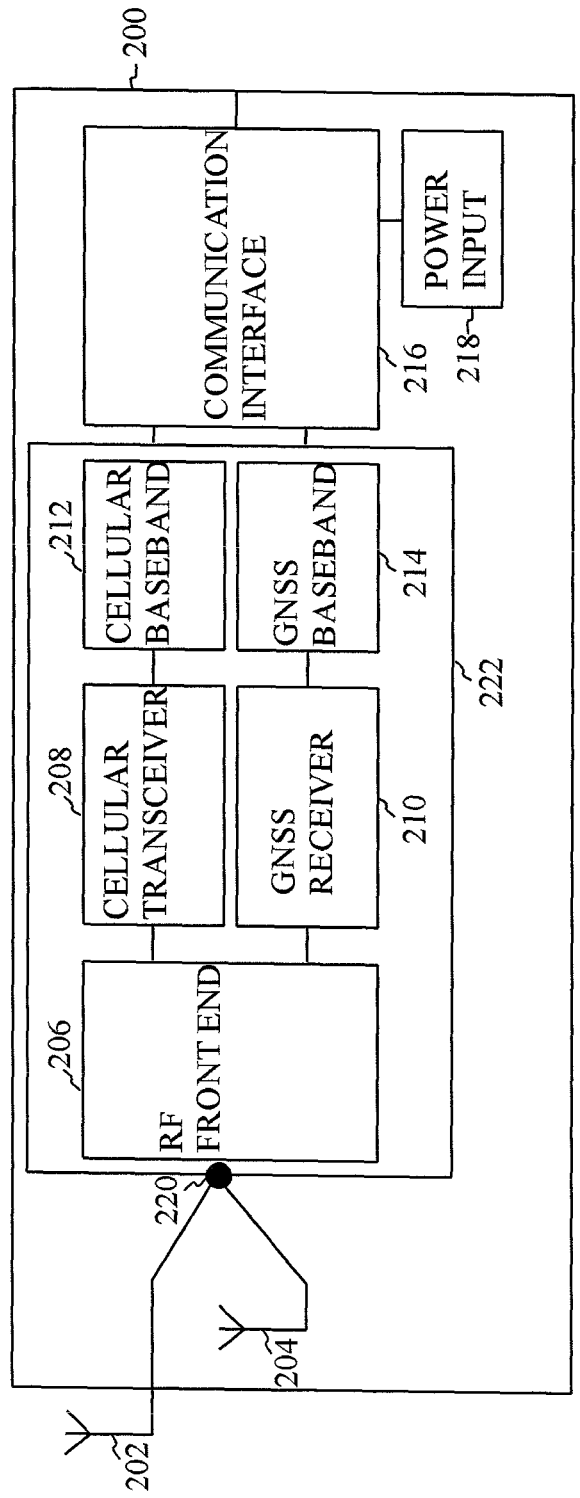
FIG. 2 is a schematic block diagram that illustrates an apparatus according to another embodiment of the invention.

FIG. 2 illustrates an apparatus 200 according to another embodiment of the invention. A first antenna 202 for cellular communications is an external antenna and it connects to an antenna interface 220. A second antenna 204 is an internal antenna for satellite positioning, for example global navigation satellite system (GNSS) communications (for example Global Positioning System (GPS), GLONASS, Galileo etc.). The external antenna 202 is connected via the antenna interface 220 to a communication module 222. The communication module 222 comprises a radio frequency (RF) front end 206. The RF front end 206 is connected to a cellular transceiver 208 and to GNSS receiver 210. The cellular transceiver 208 is connected to a cellular baseband module 212 and the GNSS receiver 210 is connected to a GNSS baseband module 214. The cellular baseband module 212 and the GNSS baseband module 214 are then connected to a communication interface 216. The communication interface 216 receives information from the cellular baseband module 212 and the GNSS baseband module 214 in a digital form. A power input 218 receives operating power for the apparatus 200 from a vehicle and provides operating power for the various elements of the apparatus 200 (not shown for clarity).

FIG. 2 illustrates that each radio communication system may have several antennae or antenna systems. Yet in another embodiment, an antenna/antennae or an antenna system/antenna systems may be shared between different communication systems. The antenna system may be designed to enable MIMO (Multiple-Input, Multiple-Output) and/or diversity communication in radio communication systems. Interoperability between different communication systems may be guaranteed, for example, by integrated antenna system(s) antenna isolations or minimum antenna isolations between separated antenna system(s).

In one embodiment of FIG. 2, the operating power is received via the communication interface 216. If a communication link between the communication interface 216 of the apparatus 200 and a master unit of a vehicle is, for example, implemented as a universal serial bus (USB) or power over Ethernet (PoE) interface, there is no need to arrange separate powering for the apparatus 200.

In another embodiment of FIG. 2, the operating power for the apparatus 200 is received by the power input 218 via a separate connection other than the communication interface 216. The communication link may be implemented with any suitable technique with or without a powering capability. In one embodiment, operating power for the apparatus 200 may be received by at least two galvanic connections with unequal routing to provide alternative powering in case the first power cable or source is not able to provide operating power for the apparatus 200. Additionally, the apparatus may be able to operate independently and be in communication with an emergency center by providing collectable information.

FIG. 2 shows that the antenna 202 is an external element and that the second antenna 204 is an internal element or system of the apparatus 200. In another embodiment, both antennae 202 and 204 may also be external to the apparatus 200. In yet another embodiment an antenna or antenna system may be partly arranged in the apparatus 200 and partly extending outside the apparatus 200.

Figure 3A:
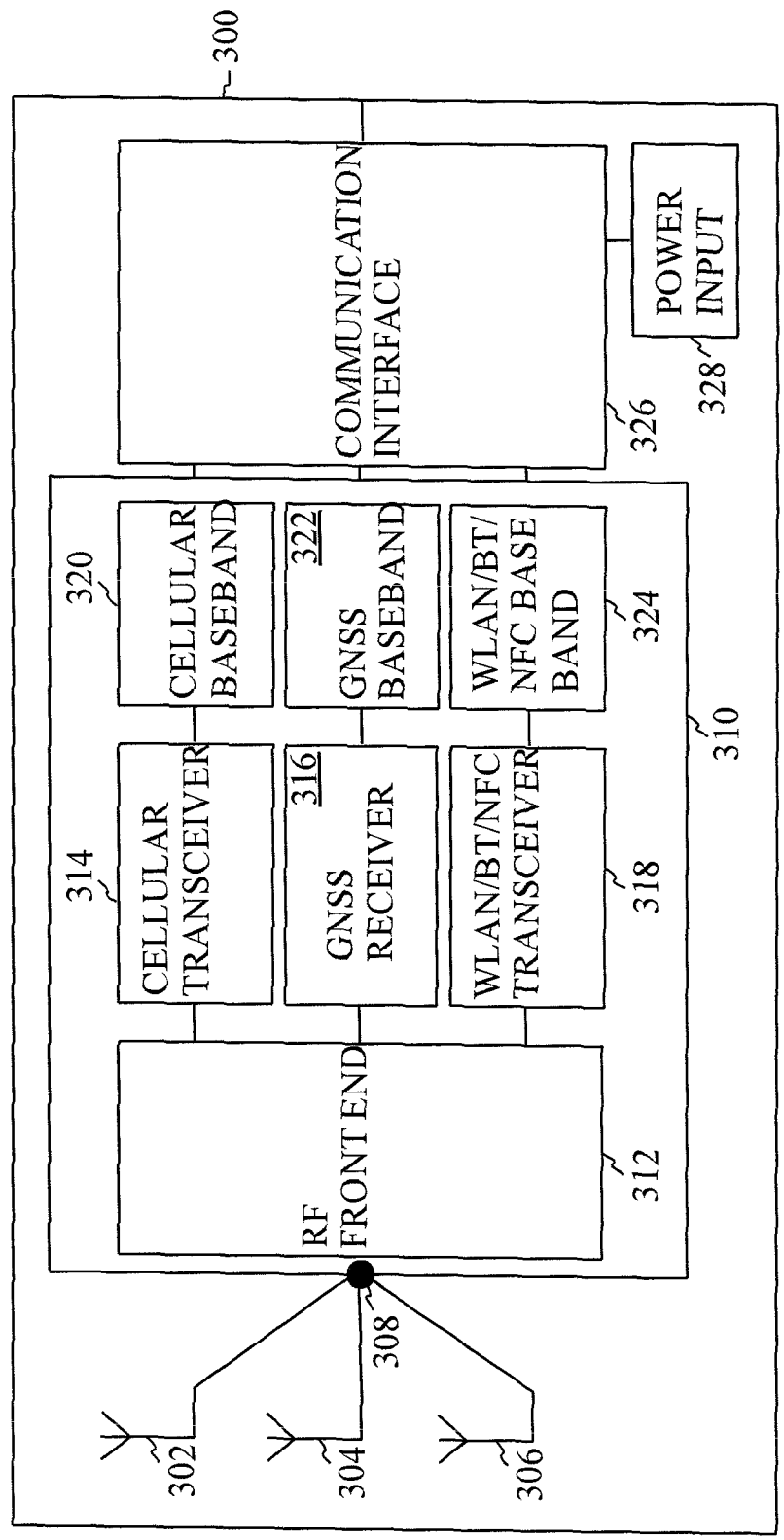
FIG. 3A is a schematic block diagram that illustrates an apparatus according to another embodiment of the invention.

FIG. 3A illustrates an apparatus 300 according to another embodiment of the invention. The apparatus 300 comprises a first antenna 302 for cellular communications, a second antenna 304 for satellite positioning, for example for GNSS communications, and a third antenna 306 for wireless short-range communication. The antennae 302-306 are connected via an antenna interface 308 to a communication module 310. The communication module 310 comprises a radio frequency (RF) front end 312. The RF front end 312 is connected to a cellular transceiver 314, to GNSS receiver 316 and to a wireless short-range transceiver 318. The cellular transceiver 314 is connected to a cellular baseband module 320, the GNSS receiver 316 is connected to a GNSS baseband module 322, and the wireless short-range transceiver 318 is connected to a wireless short-range baseband module 324. The cellular baseband module 320, the GNSS baseband module 322 and the wireless short-range baseband module 324 are then connected to a communication interface 326. The wireless short-range elements may comprise elements of, for example, a wireless local area network (WLAN), Bluetooth, a near field communication (NFC), a radio frequency identification (RFID), vehicle to vehicle communication, machine to machine communication, device to device communication, vehicle to machine communication, vehicle to device communication, machine to device communication etc. The communication interface 326 receives information from the cellular baseband module 320, the GNSS baseband module 322 and the wireless short-range baseband module 324 in a digital form. A power input 328 receives operating power for the apparatus 300 from a vehicle and provides operating power for the various elements of the apparatus 300 (not shown for clarity).

FIG. 3A illustrates that each radio communication system may have several antennae or antenna systems for, for example, diversity and/or MIMO operations of radio communication systems. Yet in another embodiment, an antenna/antennae or an antenna system/antenna systems may be shared between different communication systems. Interoperability between different communication systems may be guaranteed, for example, by integrated antenna system(s) antenna isolations or minimum antenna isolations between separated antenna system(s).

In one embodiment of FIG. 3A, the operating power is received via the communication interface 326. If a communication link between the communication interface 326 of the apparatus 300 and a master unit of a vehicle is, for example, implemented as a universal serial bus (USB) or power over Ethernet (PoE) interface, there is no need to arrange separate powering for the apparatus 300.

In another embodiment of FIG. 3A, the operating power for the apparatus 300 is received by the power input 328 via a separate connection other than the communication interface 326. The communication link may be implemented with any suitable technique with or without a powering capability.

The transceiver 318 may be a bidirectional element conveying an RF signal field captured outside of a vehicle cabin to the cabin and conveying an RF signal field captured inside the cabin to outside of the vehicle. A vehicle to vehicle communication enabled transceiver may be capable of communicating with other vehicles, devices, machines, traffic signs, road signs, traffic safety related robotics/automatics and other special purpose devices/machines etc.

In one embodiment, the apparatus 300 is able to communicate with user equipment of passengers for example via a wireless local area network transceiver for collecting/sharing special purpose information. The wireless short-range communication capability of the apparatus may also provide a connection to outside, vehicle cabin located devices, audio devices, displays, gaming devices, entertainment devices, communication devices and/or computing devices etc.

Figure 3B:
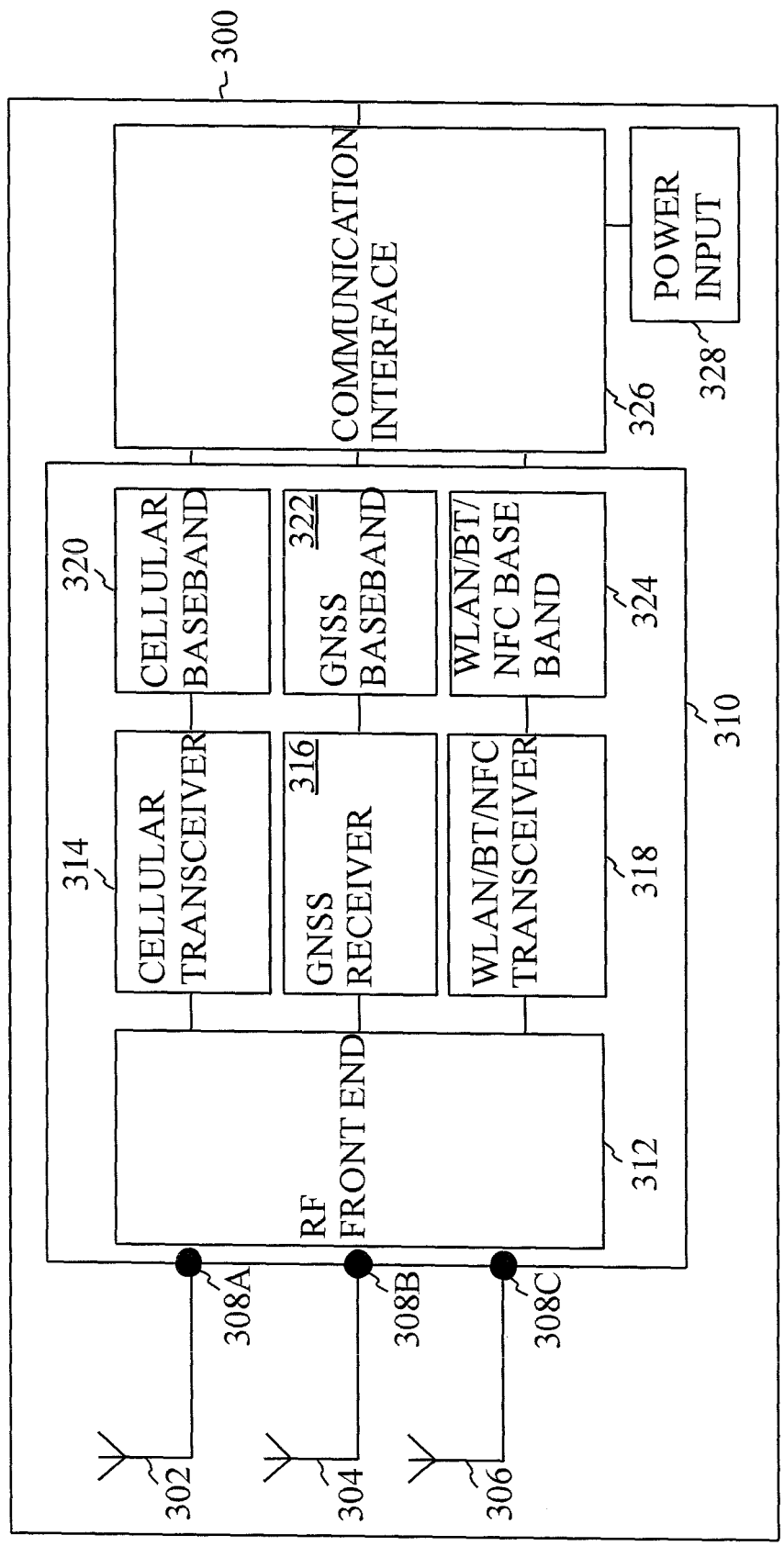
FIG. 3B is a schematic block diagram that illustrates an apparatus according to another embodiment of the invention.

FIG. 3B illustrates an apparatus 300 according to another embodiment of the invention. FIG. 3B differs from FIG. 3A only in that in FIG. 3B the antenna interface is formed by three separate antenna interfaces 308A, 308B and 308C, each of which being connected to one antenna.

Figure 3C:
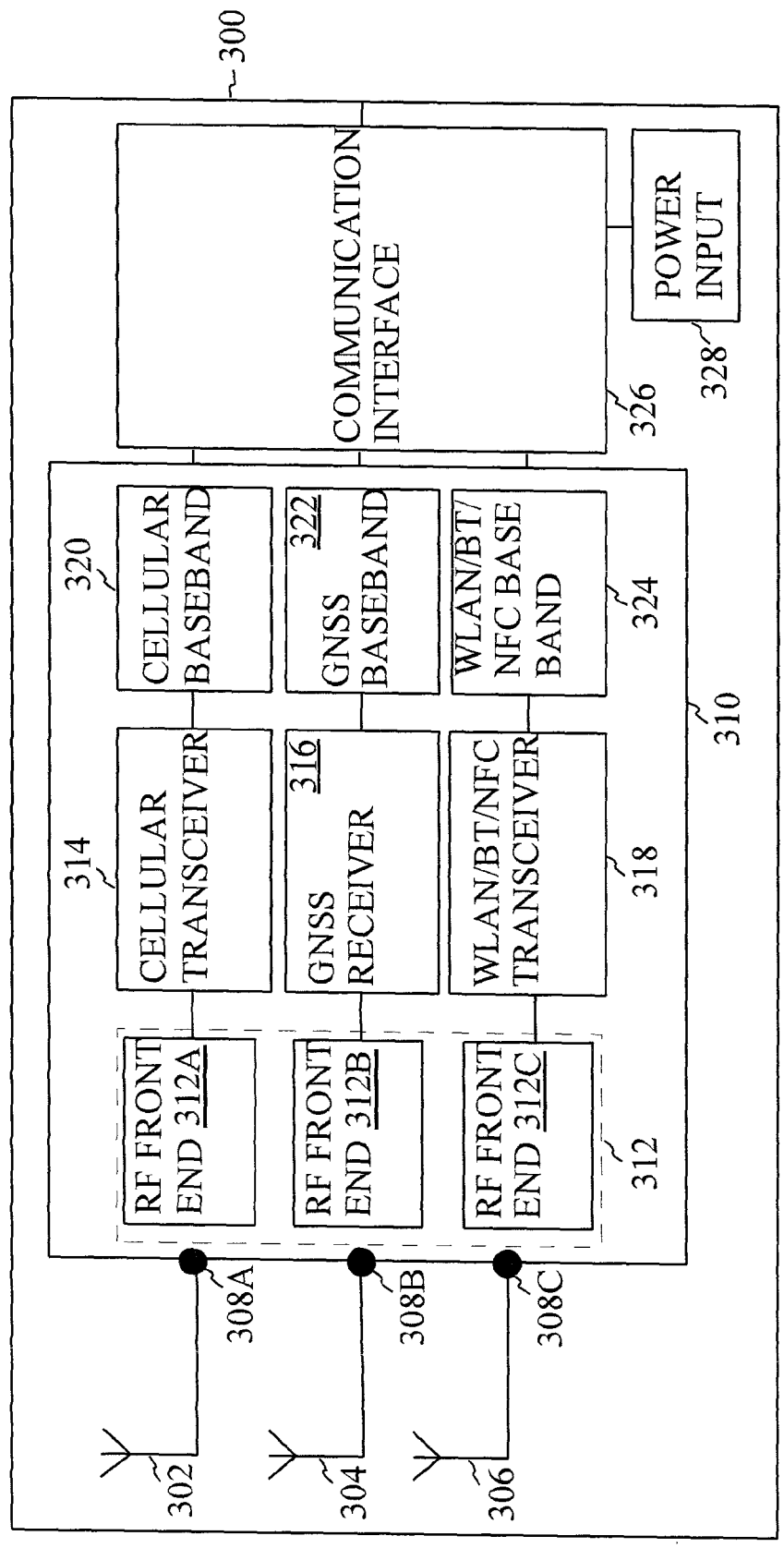
FIG. 3C is a schematic block diagram that illustrates an apparatus according to another embodiment of the invention.

FIG. 3C illustrates an apparatus 300 according to another embodiment of the invention. FIG. 3C differs from FIG. 3B only in that in FIG. 3C the RF front end 312 is formed by three separate RF front ends 312A, 312B and 312B, each of which being connected to a single antenna interface.

Figure 3D:
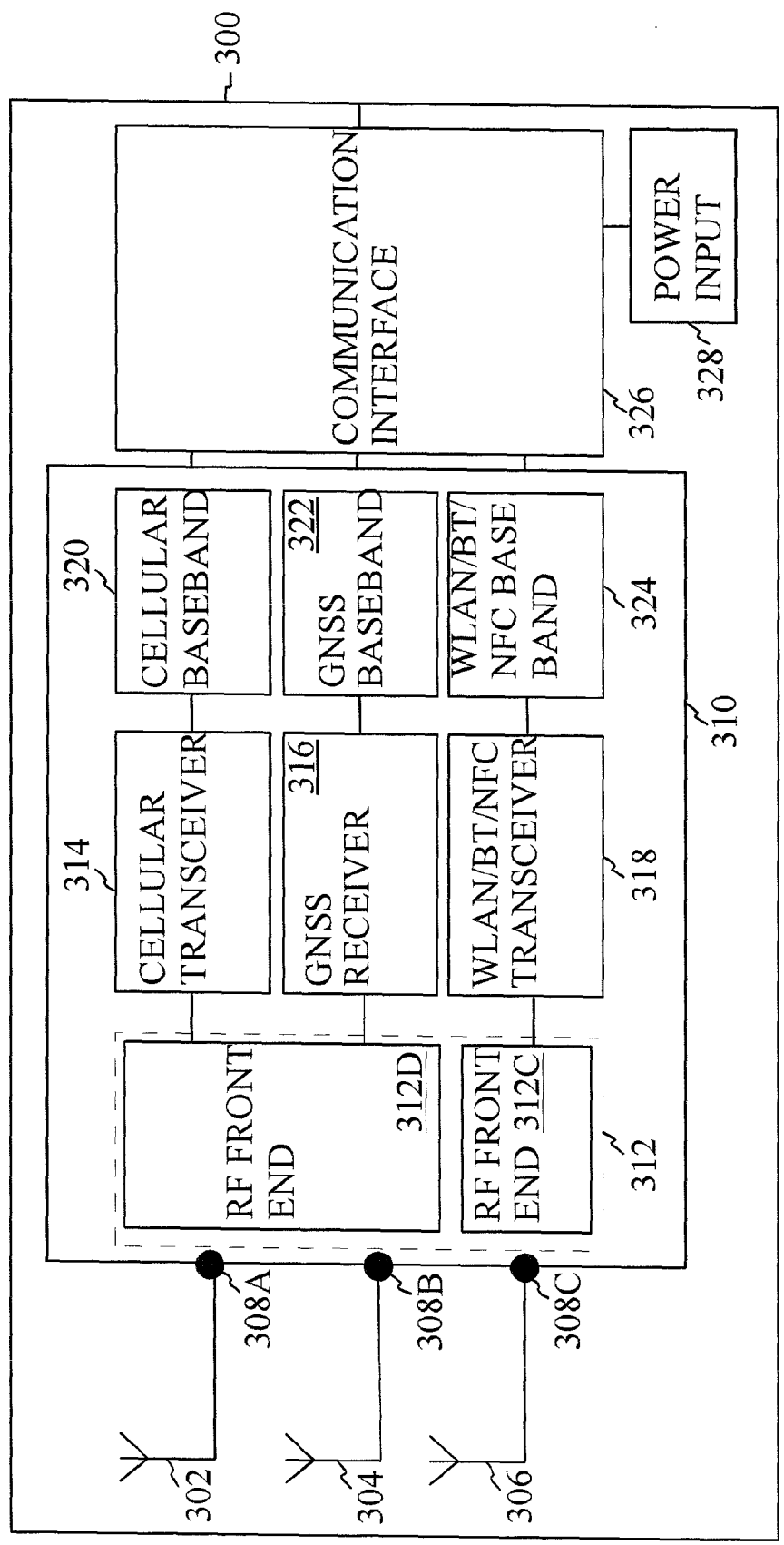
FIG. 3D is a schematic block diagram that illustrates an apparatus according to another embodiment of the invention.

FIG. 3D illustrates an apparatus 300 according to another embodiment of the invention. FIG. 3D differs from FIG. 3C only in that in FIG. 3D the RF front end 312 is formed by RF front ends 312C and 312D. The RF front end 312D communicates with the cellular transceiver 314 and the GNSS receiver 316, and the RF front end 312C communicates with the wireless short-range transceiver 318.

Figure 3E:
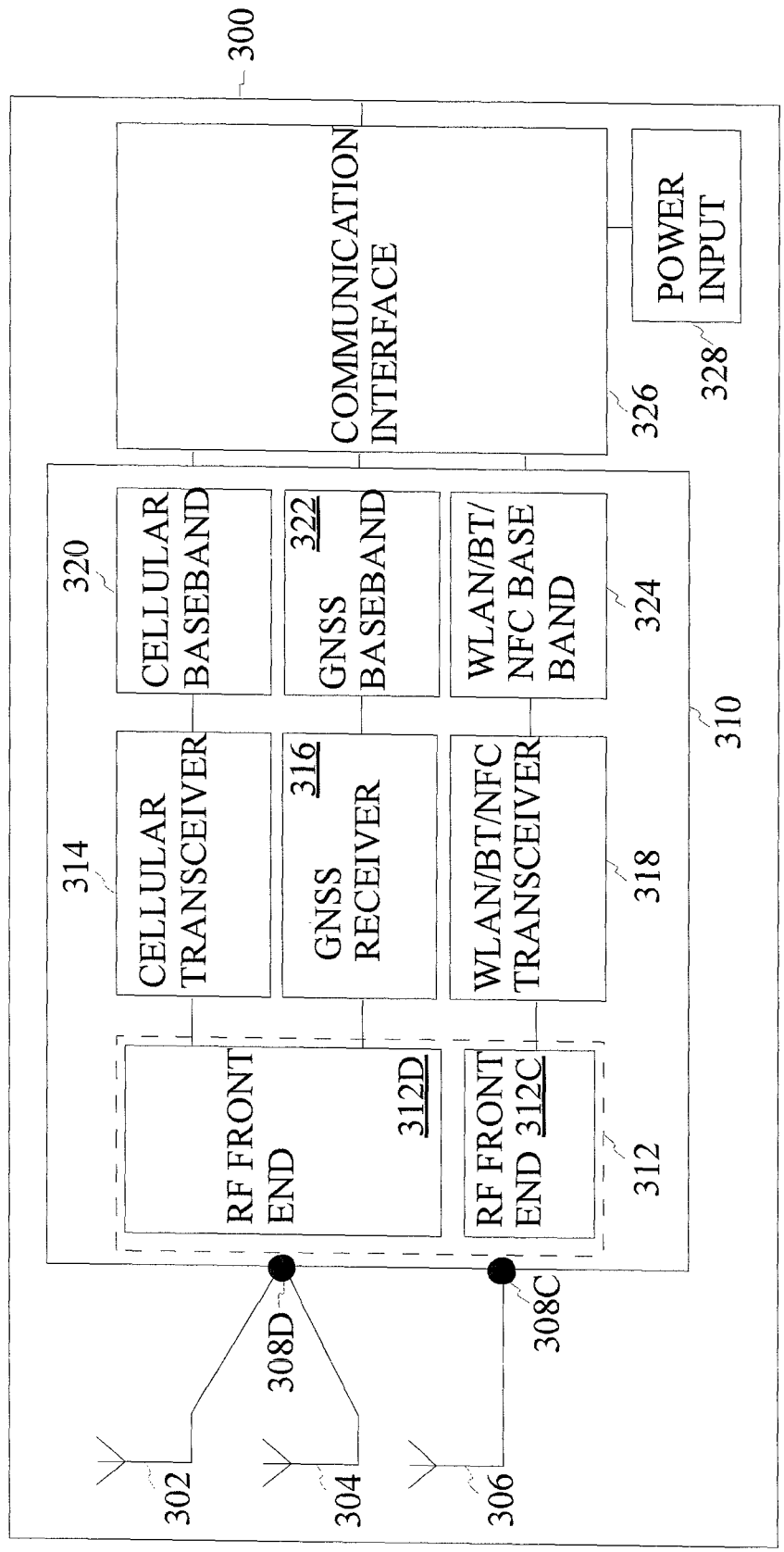
FIG. 3E is a schematic block diagram that illustrates an apparatus according to another embodiment of the invention.

FIG. 3E illustrates an apparatus 300 according to another embodiment of the invention. FIG. 3E differs from FIG. 3D only in that in FIG. 3E the antenna interface is formed by an antenna interface 308C and an antenna interface 308D. The antenna interface 308D is connected to the antennae 302 and 304 of cellular and GNSS communication. The antenna interface 308C is connected to the antenna 306 of wireless short-range communication.

Figure 3F:
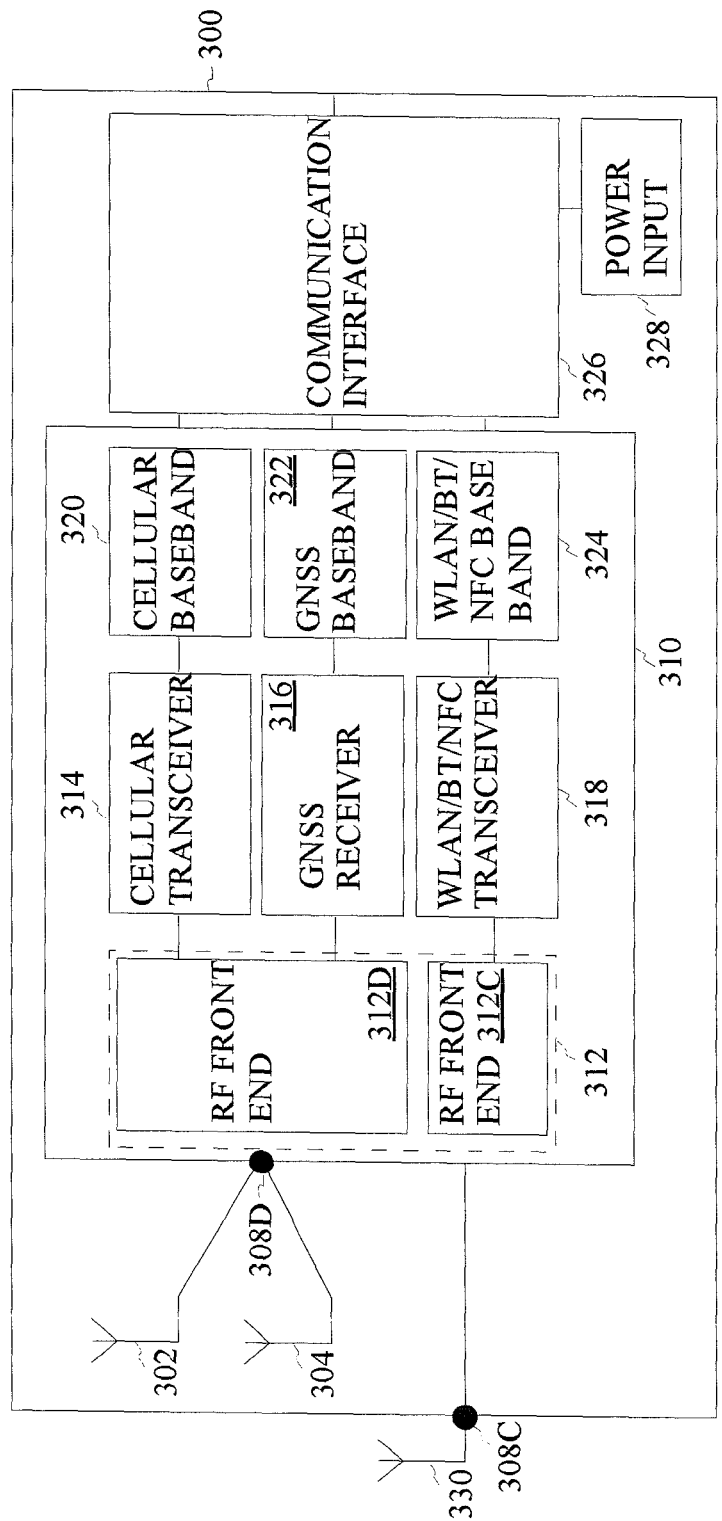
FIG. 3F is a schematic block diagram that illustrates an apparatus according to another embodiment of the invention.

FIG. 3F illustrates an apparatus 300 according to another embodiment of the invention. FIG. 3F differs from FIG. 1F only in that in FIG. 3F an antenna 330 of the wireless short-range communication is an external antenna to the apparatus 300.

Figure 3G:
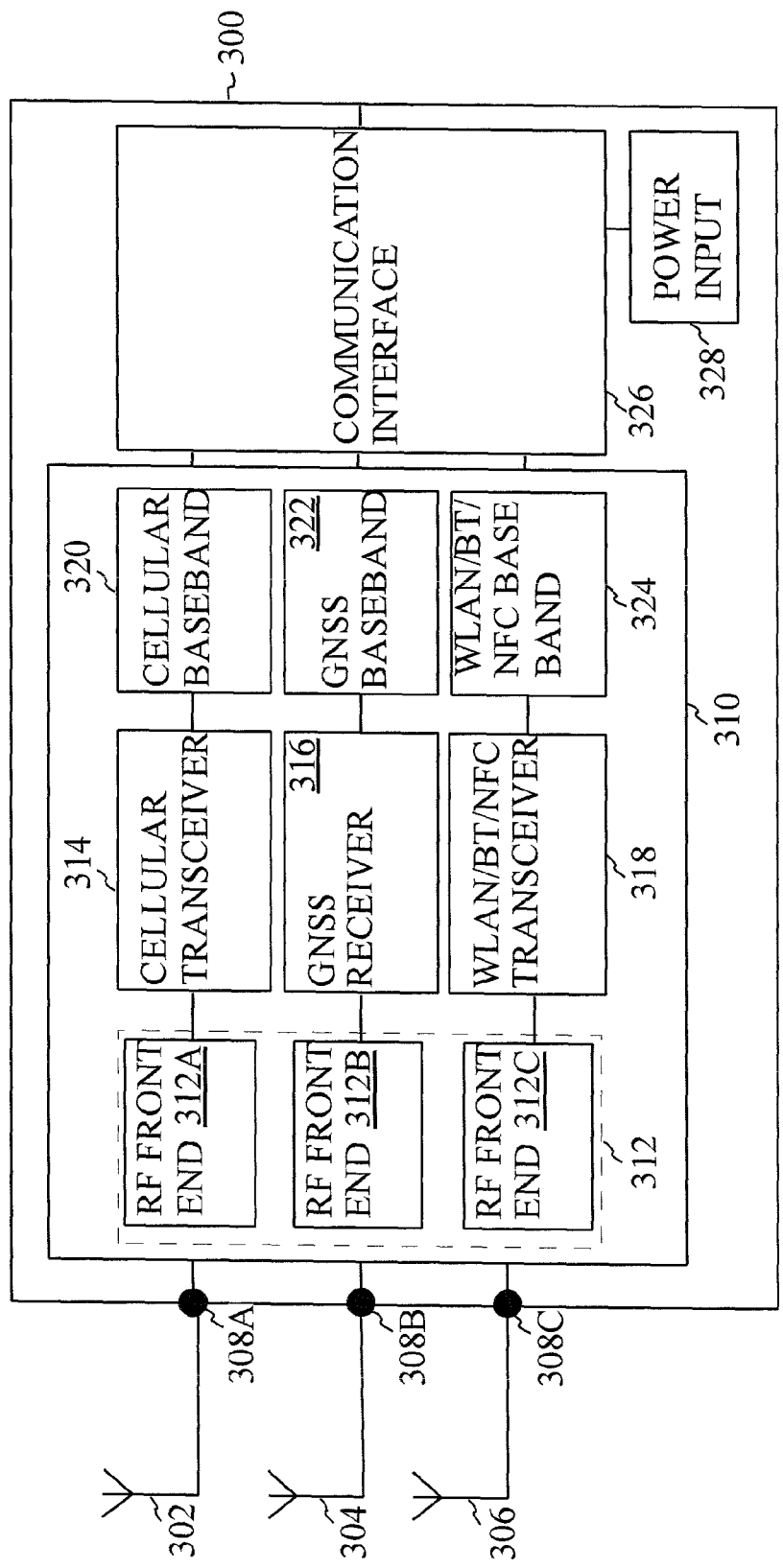
FIG. 3G is a schematic block diagram that illustrates an apparatus according to another embodiment of the invention.

FIG. 3G illustrates an apparatus 300 according to another embodiment of the invention. FIG. 3G differs from FIG. 3C only in that in FIG. 3G all the antennae are external antennae to the apparatus 300.

Antenna functionality may comprise at least one of a transmission antenna, a reception antenna, a transmission and reception antenna, an MIMO transmission antenna, an MIMO reception antenna, an MIMO transmission and a reception antenna. An antenna may be functional at least in a frequency range in the frequency domain. Additionally, an antenna may be tunable with controls at least for one operational frequency. An antenna may be used by a radio or it may have shared functionality between different radios. In one embodiment, any antenna disclosed in any of FIGS. 1, 2 and 3A-3G may present antennas of an MIMO/a diversity antenna system. A first antenna may contain operational frequencies for transmission and reception and a second antenna may contain reception frequencies of different radio systems. Furthermore, the second antenna may be an antenna, which contains transmission and reception frequencies. Furthermore, a radio front end, a radio receiver or transceiver, a radio baseband module have needed special purpose functional blocks and special purpose software for MIMO radio operation.

Furthermore, it is evident that the location and amount of antennae disclosed in FIGS. 1, 2 and 3A-3G are only exemplary and other embodiments of the invention may comprise any appropriate amount of antennae in desired locations.

The apparatus disclosed in FIGS. 2 and 3A-3G may comprises also other types of receivers or transceivers not shown in the Figures, for example frequency modulation receiver/transmitter, a digital audio broadcasting receiver, a digital radio broadcasting receiver, a digital television broadcasting receiver etc.

In FIGS. 3A-3G it was disclosed that the antenna interfaces were separate elements in the apparatus. In another embodiment, the antenna interface may be a feature of an RF front end or of any other appropriate module or element.

The apparatus disclosed in FIGS. 1, 2 and 3A-3G may comprise one or several elements not disclosed in FIGS. 1, 2 and 3A-3G, for example, a memory or memories, SW executable memory, SW executable memories, a processor or processors for modem and application purposes. The apparatus may also include other elements or modules that may be used in various vehicle related applications, e.g. a camera, a microphone, a loudspeaker, an emergency battery for providing power for the apparatus in case the main power feed fails, an accelerometer, temperature and other special purpose sensor etc. In one embodiment, the apparatus uses the microphone and the loudspeaker for providing audio user interface functionalities, and they may be automatically activated in case of an emergency call.

The apparatus disclosed in FIGS. 1, 2 and 3A-3G may also include a user identity module interface for receiving a user identity module of a user, for example, a subscriber identity module (SIM) or any other module that identifies a user or a subscriber. In another embodiment, the apparatus is configured to receive and/or share information relating to a user identity module via the digital communication interface. In other words, when a user identity module has been connected via the user identity module interface, information contained in the user identity module may be shared via the digital communication interface. In another embodiment, if the apparatus comprises wireless short-range capabilities, for example Bluetooth or near field communication capabilities, the apparatus may receive user identity module related information via the wireless short-range capability. Similarly, in one embodiment, the apparatus may send user identity module related information via the wireless short-range communication capability.

Furthermore, the apparatus disclosed in FIGS. 1, 2 and 3A-3G may also include at least one auxiliary interface for connecting to at least one auxiliary module or device.

Furthermore, FIGS. 1, 2 and 3A-3F describe exemplary amount and location for antenna interfaces. In other embodiment, the apparatus may have any number of antenna interfaces and one or more antenna may be connected to a single antenna interface. An antenna interface may be a separately implemented interface or a feature of another element, module or unit. A single antenna interface may connect both to internal and external antennae.

Figure 4:
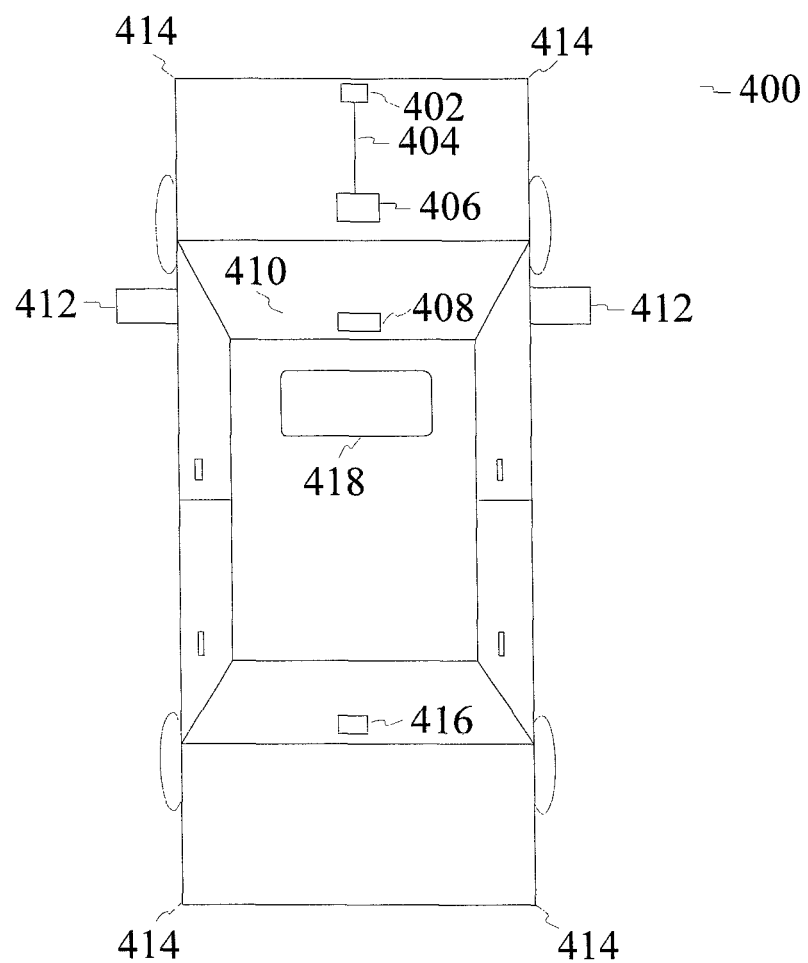
FIG. 4 is a schematic block diagram that illustrates a vehicle comprising an apparatus according to an embodiment of the invention.

FIG. 4 illustrates a vehicle 400 comprising an apparatus 402 according to one embodiment of the invention. In the embodiment disclosed in FIG. 4, the apparatus 402 has been integrated into one housing module, a brand logo module in the front part of the vehicle 400. In the integrated solution, the apparatus 402 has a built-in antenna or antennae or antenna system(s). In another embodiment, the antenna or antennae may be partly arranged in the apparatus 402 and partly extending outside the apparatus 402. Yet in another embodiment, one or more antenna may be external to the apparatus 402 and one or more antenna may be an integral antenna of the apparatus 402. If the antenna is an external antenna, antenna cabling length to the apparatus 402 is kept in minimum in order to keep attenuation and interferences/noise resulting from the antenna cable as low as possible.

When the apparatus 402 uses a built-in antenna or antennae, the apparatus is located in the vehicle such that the antenna or antennae are avoiding attenuation caused by the vehicle industrial design, integrated metal parts, screws, vehicle chassis, defrosting elements in windows or windows.

A communication link 404 between the apparatus and a master unit 406 of the vehicle may be implemented with any communication link that is able to transmit digital data. The link 404 is implemented, for example, using USB or PoE. The communication link 404 may also be implemented as a wireless link. The master unit 406 may be any appropriate unit or module of the vehicle 400 that is able to communicate with the apparatus 402 and provides other vehicle related functions. Furthermore, the master unit 406 can provide user with functionalities and/or user interface to various services such as car control and car infotainment. The master unit 406 may, for example, be a car computer which may supervise various car functionalities and provide the user information about how car works and warns about problems. It may also provide user interface to navigation, radio, audio, video and/or communication services.

In one embodiment, the communication link 404 provides also operating power for the apparatus 402. In another embodiment, a separate power feed (not shown in FIG. 4) is arranged for the apparatus 402.

The apparatus may alternatively be also in other locations in the vehicle 400. In one embodiment, the apparatus 402 is integrated in a side view mirror 412. In another embodiment, the apparatus 402 is integrated in a brand logo module in rear of the vehicle 400. Yet in another embodiment, the apparatus 402 has at least one external antenna and the antenna has been integrated into a windscreen 410 and the apparatus 402 itself is integrated into a rear-view mirror 408. In another embodiment, the vehicle 400 farther comprises at least one antenna integrated to a roof window 418 of the vehicle 400 or proximity of roof window 418 of vehicle, the antenna being coupled to the apparatus via the antenna interface, and a rear-view mirror housing 412 comprises the apparatus. Furthermore, alternative areas of roof where antenna is located may be designed to operate with antenna. This may be implemented, for example, with material selections with which attenuation to a radio communication link is minimal or negligible. Another possible location for an antenna is at least one front light and rear light (as indicated with references 414). It is possible to place an antenna or antennae to each of the lights or to any possible combination of the lights or light housing. The apparatus may be located in proximity of any of the lights. Yet another possible location for the apparatus and/or at least one antenna is the additional rear brake light 416 in a back window.

The vehicle 400 may also comprise several apparatuses, which have been chained together and one of them comprises a connection to the master unit 406. Alternatively, each apparatus may have a separate connection to the master unit 406.

An antenna or antennae are usually located in top blocks of the vehicle 400 in order to achieve satisfactory conditions for receiving and transmitting radio frequency signals. Surrounding of an antenna or antennae and/or a vehicle part (for example a window, a side mirror housing, a front pillar ("A pillar"), a middle pillar ("B pillar"), a rear pillar ("C pillar"), a light housing, a brand logo etc.) comprising an antenna or antennae may be designed such that needed efficiency and directional pattern(s) is achieved for the antenna or antennae.

Furthermore, an antenna system on the roof or anywhere else in the vehicle chassis may be done from different material than the area in proximity of the antenna. This kind of antenna may be changeable or upgradable according to various requirements. These requirements may include, for example, a market area, country(s), needed antenna frequency combinations, needed antenna count etc.

Furthermore, an antenna may be a separate antenna element or it may be integrated/embedded into some module part or vehicle part of the vehicle. In one embodiment, the module part may comprise also the apparatus, i.e. the apparatus is included inside the module part housing. The module part or vehicle part may be any window (a window surface and/or a window layer), a side mirror housing, a front pillar ("A pillar"), a middle pillar ("B pillar"), a rear pillar ("C pillar"), a rear brake light housing, a brand logo etc. Practically any part of the vehicle having industrial design may act as housing for the apparatus as long as at least one of attenuation, noise, interference of radio frequency signals and antenna radiation efficiency is in a tolerable level. The tolerable level means, for example, that the that apparatus in operation, an antenna interface and an antenna/antenna system fulfills at least minimum performance level required by standards, operator requirements, product requirements, electromagnetic compatibility (EMC), electrostatic discharge (ESD), specific absorption rate (SAR), interoperability.

Generally top blocks of a vehicle are providing desirable performance for antenna design, but lower blocks of the vehicle between front and rear bumpers may also be used for housing the apparatus. Usability of the apparatus is not limited to forms of automobiles, for example, to a sports car, a cabriolet, a hardtop, a coupe, a van, a people carrier, a space car, a bus, a liftback, a tourer, a station wagon, a sport utility vehicle, a cross over, a lorry, a truck etc. Instead, any other vehicle may be used.

When the apparatus disclosed in FIG. 1, 2 3A-3G is implemented as an apparatus comprising an integrated antenna or antennae, all type approval needed parts may be are located in a single vehicle module, for example, a side view-mirror, a rear-view mirror, a roof console inside the vehicle, a brand logo module etc. Furthermore, signal attenuation/interferences/noise is minimized.

Furthermore, although FIGS. 1, 2 and 3A-3G were disclosed to represent an apparatus according to the invention, FIGS. 1, 2 and 3A-3G can also be regarded as representing vehicle parts comprising the apparatus. For example, such a vehicle part may be, for example, side-minor housing, a rear-view minor housing, brand logo module etc.

Furthermore, the above description has discussed various implementation alternatives for the apparatus and the antenna or antennae location. In general, part of the apparatus may locate inside the vehicle chassis and the remaining part outside the vehicle chassis. This enables, for example, a solution where an antenna or antennae are located outside the vehicle chassis and the apparatus is in proximity inside the vehicle chassis. When the apparatus comprises an integrated antenna or antennae, it may also be possible to position the apparatus in the vehicle such that the part of the apparatus including the integrated antenna or antennae is positioned outside the vehicle chassis so that the antenna or antennae will function properly.

Automotive industry tends to utilize same parts and modules across model lineup, facelift upgrades and different generations. As the apparatus is of integrated design and even with antenna systems, an industrial designer of a car may integrate the apparatus in various car models during time. This is advantageous because module and antenna systems are once certified and type approved, and thus results can be reused in new industrial designs.

Furthermore, embodiments of the invention provide a cost effective solution where all type approval/certification needed parts can be located in a single packaged module or vehicle part. Furthermore, interference and signal attenuation is reduced.

The invention has been described using certain elements, modules and interfaces as examples. It is evident that at least some of the modules or elements described as separate modules or elements may also be implemented as a single integrated module or element. Furthermore, even though the FIGS. 1, 2 and 3A-3G describe separate elements, i.e. RF front end, transceiver and baseband, there is lot of design choices in how these elements may be grouped or implemented in a product. In one embodiment, all elements may be separate physical units within a module, for example chips. In another embodiment, all elements of one type of radio may be integrated into single chip. In another embodiment, it is also possible to implement all different radios needed in the apparatus into a single chip. Thus, it is evident that FIGS. 1, 2 and 3A-3G describe only one possible implementation and that also other implementations are possible without deviating from the invention.

As has already been indicated, according to embodiments of the invention, normal technology used for enabling a user interface for at least one of cellular telephony, car infotainment and any consumer electronics within the vehicle can be connected to the apparatus according to the invention. This way the requirements of automotive environment can be fulfilled. In a normal operation mode the apparatus primarily utilizes equipment or auxiliary accessories installed or available in the vehicle for providing user interface functionalities, driven by a user, for example for making or answering cellular phone calls. The apparatus may, however, comprise elements and/or functionality for controlling user interface elements (which are external to the apparatus) providing a user interface to a user. In another embodiment, the apparatus does not comprise controlling functionality of the user interface elements, and the master unit or other vehicle related unit controls the actual user interface elements. For example, the apparatus may utilize equipment or auxiliary accessories installed or available in the vehicle for providing user interface functionalities such as at least one of a display of one or more displays, a microphone or microphones, a loudspeaker or loudspeakers, and different types of input devices like a keypad/keypads, a joystick, gestures, a touch display or a touchpad/touchpads. In any event, the interface may be arranged to stimulate/generate control signals, in response to user-driven interactions, for controlling the operation of the communication apparatus.

In one embodiment, the apparatus may comprise user interface elements, for example a microphone and a loudspeaker, for providing audio user interface functionalities in an emergency operation mode. Such an emergency mode of operation may, for example, be activated automatically via one or more sensors (e.g. an accelerometer) in the vehicle, or in the apparatus, that detect rapid deceleration and/or impact. For example, a controller of the apparatus may receive an impact signal from an accelerometer and, in response, switch to the emergency mode of operation. In other embodiments, the apparatus may be switched to the emergency mode in response to the loss of a connection between the apparatus and the vehicle (e.g. detected by a change in voltage or current), or at least a loss of connection from normally-used vehicle components, such as an integrated microphone, a speaker unit, a master unit, a power supply and/or an external antenna. In some embodiments, therefore, the apparatus itself may activate the emergency mode while, in other embodiments, other vehicle systems may activate the emergency mode via, for example, the master unit or an alarm system. In yet further embodiments, the emergency mode may be activated by actuating a button, for example a 'panic button' or switch, located either on the apparatus or remote from it (via an appropriate connection), or by a voice-activation capability, wherein such capability may again be provided by the apparatus or by the vehicle. Voice activation may, for example, be responsive to a certain word or words uttered by the user, in a similar manner to which modern mobile telephones may employ voice-dialing. In further embodiments, the emergency mode may be capable of being activated by receipt of a remotely generated signal, for example, which has been generated and transmitted by the emergency services as a cellular, RF or any other appropriate kind of signal that can be received by the apparatus. In yet other embodiments, the apparatus may be arranged so that an emergency mode of operation can be activated in various different ways, including at least by one or more of the aforementioned ways. In any event, according to the various embodiments, and although not specifically illustrated in the drawings, the apparatus comprises appropriate circuits, sensors, processing units and/or modules to perform emergency mode switching and activation as described.

These external equipment or auxiliary devices may be connected to the apparatus by using the digital communication link, and/or with a short range radio link, and they can be controlled by the apparatus. Alternatively, the user interface equipment or auxiliary accessories can be provided by or controlled, for example, through the master unit. Any combination of sharing the controlling between the apparatus and other vehicle units is also possible without deviating from the invention.

It is to be understood that the exemplary embodiments are for exemplary purposes, as many variations of the specific hardware used to implement the exemplary embodiments are possible, as will be appreciated by those skilled in the hardware art(s)/industrial designer(s). The embodiments of the invention and various features and elements in the embodiments described in the description may be used in any combination with each other. Several of the embodiments may be combined together to form a further embodiment of the invention. For example, the functionality of one or more of the components of the exemplary embodiments can be implemented via one or more hardware devices, or one or more software entities such as modules. Alternatively housing containing the apparatus and/or an antenna, antennae, antenna systems may contain other functionalities needed in a vehicle. These functionalities may comprise lighting, voice, visibility, mirrors, parts enabling mechanical connectability, brand logo, air flow or turbulence controls, industrial design objects and other special purpose objects. Functionalities may also be passive or active, which may be controlled by a car controlling unit or controlled by user.

The exemplary embodiments can store information relating to various processes described herein. In one embodiment stored information may be information collected by an automotive event data recorder (EDR). This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits, a chip or chips, chipsets, a processor or processors, a memory or memories, radio frequency integrated circuits (RFIC), a digital signal processor (DSP) or processors, by interconnecting an appropriate network of conventional component circuits, semiconductor technologies, or by any other programmable device or devices and any combination of these, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a hard disk or any other suitable magnetic medium, a RAM, a PROM, an EPROM, a FLASH-EPROM, any other suitable memory chip or cartridge, a carrier wave or any other suitable medium from which information can be read.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. Apparatus comprising:
   a wide-area communication capability;
   at least one antenna interface for conveying signals to and/or from at least one antenna providing wide-area communication;
   at least one power input configured to receive operating power for the apparatus from a vehicle; and
   at least one digital communication interface for providing connectivity to a master unit of the vehicle,
   wherein the apparatus is arranged for installation into a vehicle and provides a user-driven communication capability in a vehicle communications system,
   wherein the at least one power input receives operating power for the apparatus via the at least one digital communication interface.

2. The apparatus according to claim 1, supporting at least a first, normal mode of operation and a second, emergency mode of operation, and comprising means to switch between said modes of operation.

3. The apparatus according to claim 2, wherein, in the normal operation mode, a user interface for the apparatus is provided by equipment external of the apparatus.

4. The apparatus according to claim 2, further comprising user interface elements for providing audio user interface functionalities only in an emergency operation mode.

5. The apparatus according to claim 1, wherein a user interface, by which a user can communicate using the apparatus, is provided by the vehicle communications system and, wherein, the apparatus, at least during a normal mode of operation thereof, is arranged to operate in response to signals from the user interface and facilitate user communications via the user interface.

6. The apparatus according to claim 1, comprising means to provide at least one additional wide-area communication capability.

7. The apparatus according to claim 6, wherein the at least one additional wide-area communication capability comprises at least one of positioning capability by time delay/difference measurements, frequency modulation (FM) capability, amplitude modulation (FM) capability, digital broadcasting radio capability, digital television broadcasting capability and vehicle to vehicle communication capability.

8. The apparatus according to claim 7, wherein the at least one antenna interface is arranged to convey signals to and/or from at least one antenna for providing the at least one of positioning capability, frequency modulation capability, amplitude modulation capability, digital broadcasting radio capability, digital television broadcasting capability, and vehicle to vehicle communication capability.

9. The apparatus according to claim 1, further comprising means to provide at least one short-range communication capability.

10. The apparatus according to claim 9, wherein the at least one antenna interface is arranged to convey signals to and/or from at least one antenna for providing short-range communication.

11. The apparatus according to claim 1, wherein one or more antenna of the at least one antenna is an integrated antenna of the apparatus.

12. The apparatus according to claim 1, wherein one or more antenna of the at least one antenna is an external antenna to the apparatus.

13. The apparatus according to claim 1, wherein the wide-area communication capability comprises a cellular wireless communication capability.

14. The apparatus according to claim 1, wherein the at least one short-range communication capability comprises at least one of a frequency modulation (FM) radio capability, amplitude modulation (AM) capability, a wireless short-range communication capability, a near field communication (NFC) capability, and a radio frequency identification (RFID) capability.

15. The apparatus according to claim 1, wherein the at least one digital communication interface provides the connection to the master unit of the vehicle via a wireless communication link.

16. The apparatus according to claim 1, wherein the at least one digital communication interface provides the connection to the master unit of the vehicle via a wired communication link.

17. The apparatus according to claim 1, comprising a user identity module interface for receiving a user identity module.

18. The apparatus according to claim 1, configured to receive and/or transmit information relating to a user identity module via the at least one digital communication interface.

19. The apparatus according to claim 1, configured to receive and/or transmit information relating to a user identity module via wireless short-range communication.

20. The apparatus according to claim 1, comprising a single packaged vehicle part or module.

21. A vehicle part comprising an apparatus according to claim 1.

22. The vehicle part according to claim 21, wherein the vehicle part comprises at least one integrated antenna for providing communication capability for the apparatus.

23. The vehicle part according to claim 21, wherein an antenna cabling length is minimized between the at least one integrated antenna of the vehicle part and the apparatus.

24. The vehicle part according to claim 21, being a vehicle part where at least one of attenuation, noise, interference of radio frequency signals and antenna radiation efficiency is in a tolerable level when installed in a vehicle.

25. The vehicle part according to claim 21, wherein the vehicle part comprises one of a window, a rear-view mirror, a side mirror housing, a front pillar, a middle pillar, a rear pillar, a light housing and a brand logo.

26. A vehicle comprising:
   an apparatus as claimed in claim 1;
   a master unit configured to communicate with the apparatus; and
   power providing means for providing operating power for the apparatus via the at least one digital communication interface.

27. The vehicle according to claim 26, further comprising at least one antenna integrated to a window of the vehicle and coupled to the apparatus via the at least one antenna interface, wherein the apparatus is arranged in proximity in relation to the at least one antenna integrated to the window.

28. The vehicle according to claim 27, wherein the apparatus comprises at least one internal antenna and the apparatus is integrated in a vehicle part where at least one of attenuation, noise, interference of radio frequency signals and antenna radiation efficiency is in a tolerable level.

29. The vehicle according to claim 27, further comprising at least one antenna integrated in a vehicle part where at least one of attenuation, noise, interference of radio frequency signals and antenna radiation efficiency is in a tolerable level.

30. The vehicle according to claim 28, wherein the antenna cabling length is minimized between the vehicle part and the apparatus.

31. The vehicle according to claim 28, wherein the vehicle part comprises one of a window, a rear-view mirror, a side mirror housing, a front pillar, a middle pillar, a rear pillar, a light housing and a brand logo.

\* \* \* \* \*

UNITED STATES PATENT AND TRADEMARK OFFICE
CERTIFICATE OF CORRECTION

| | |
|---|---|
| PATENT NO. | : 8,750,944 B2 |
| APPLICATION NO. | : 13/359092 |
| DATED | : June 10, 2014 |
| INVENTOR(S) | : Seppo Rousu et al. |

Page 1 of 1

It is certified that error appears in the above-identified patent and that said Letters Patent is hereby corrected as shown below:

In the Claims:

Claim 7, column 16, line 16: Replace "amplitude modulation (FM) capability," with --amplitude modulation (AM) capability,--.

Signed and Sealed this
Twenty-eighth Day of October, 2014

Michelle K. Lee
*Deputy Director of the United States Patent and Trademark Office*